(12) United States Patent
Miyazaki et al.

(10) Patent No.: US 7,419,064 B2
(45) Date of Patent: Sep. 2, 2008

(54) WORKING MACHINE

(75) Inventors: Kazuyuki Miyazaki, Akashi (JP); Mitsuo Kakeya, Akashi (JP)

(73) Assignee: Kobelco Cranes Co., Ltd, Tokyo (JP)

( * ) Notice: Subject to any disclaimer, the term of this patent is extended or adjusted under 35 U.S.C. 154(b) by 0 days.

(21) Appl. No.: 11/673,194

(22) Filed: Feb. 9, 2007

(65) Prior Publication Data

US 2007/0207663 A1 Sep. 6, 2007

(30) Foreign Application Priority Data

Mar. 4, 2006 (JP) .............................. 2006-058772

(51) Int. Cl.
*B66C 23/84* (2006.01)
(52) U.S. Cl. ...................... 212/181; 212/253; 384/591; 384/593
(58) Field of Classification Search ................ 212/180, 212/181, 253; 384/591–593
See application file for complete search history.

(56) References Cited

U.S. PATENT DOCUMENTS 3,921,817 A * 11/1975 Petrik et al. ................. 212/181
3,923,407 A * 12/1975 Jensen et al. ................ 403/165
3,941,252 A * 3/1976 Six et al. ..................... 212/181
4,478,340 A * 10/1984 Delago ....................... 212/253

FOREIGN PATENT DOCUMENTS

JP 63-23422 6/1988

* cited by examiner

*Primary Examiner*—Thomas J. Brahan
(74) *Attorney, Agent, or Firm*—Oblon, Spivak, McClelland, Maier & Neustadt, P.C.

(57) ABSTRACT

At an inner circumference side of a lower ring and an upper ring, flange pars are formed respectively, and a ring-shaped clamp device is arranged at the inner circumference side, and separated at four points, into a front side, back side, left side, and right side, and divided into four divided clamps. At the separation points of front and back sides, the left and right divided clamps are rotatably connected with each other, and at the separation points of left and right sides, the front and back divided clamps are connected to cylinders respectively. By the extension/contraction operation, the front and back clamps move between joint and separation positions, and if the front and back clamps position at the joint points, predetermined spaces are formed between the divided clamps. Lock blocks to be inserted into the spaces for regulating return of the divided clamps to the separation positions are provided.

3 Claims, 4 Drawing Sheets

WORKING MACHINE

BACKGROUND OF THE INVENTION

1. Field of the Invention

The present invention relates to a working machine such as a crane or hydraulic shovel which includes an upper/lower part joining device for detachably joining a lower traveling body and an upper rotating body.

2. Description of the Related Art

To convey a working machine such as a large crawler crane by a trailer, by weight regulations on roads, it is required to separate a lower traveling body and an upper rotating body. With this view, upper/lower part joining devices for detachably joining a lower traveling body and an upper rotating body by placing an upper ring of the upper rotating body on a lower ring of the lower traveling body, and sandwiching flange parts formed in the both rings respectively with a clamp device have been known.

With respect to the upper/lower part joining devices, for example, Japanese Examined Utility Model Registration Application Publication No. 63-23422 discloses a structure that while a flange part is formed to protrude to the outer circumference side of a lower ring and an upper ring, a ring-shaped clamp device is provided to the outer circumference side of the lower ring and the upper ring and divided into two divided clamps. To an opposite end part outer circumference side of the each divided clamp, a bracket is provided respectively, and between the opposite brackets, fluid pressure cylinders for moving the divided clamp to a joint position where the divided clamps come close each other to sandwich flange parts and to a separation position where the clamps are away each other are provided. Further, bolts for rigidly joining and fixing the divided clamps each other when the divided clamps are moved to the joint position by the fluid pressure cylinders, and extend in parallel with the fluid pressure cylinders are detachably attached. In such a case, only two fluid pressure cylinders are necessary and the device can be simplified. Moreover, because the divided clamps are jointed each other with the bolts which are fixation means different from the fluid pressure cylinders, the flange parts are credibly sandwiched by the clamp devices and even if a fluid leak occurs in the fluid pressure cylinders, the clamp devices are prevented from opening and releasing the joints.

However, in this case, although the space between the lower traveling body and the upper rotating body where the device is to be installed is narrow, the divided clamps are joined by the bolts as the fixation means different from the fluid pressure cylinders. The fastening and detachment of the bolts is not easy and operationality is not good. Especially, if the bolt is arranged at a position closer to the clamp device than the fluid pressure cylinder, that is, inside, to increase the strength of joint with the bolt, the fluid pressure cylinder interrupts the fastening of the bolt, or the like, and the operationality becomes worse.

SUMMARY OF THE INVENTION

Accordingly, it is an object of the present invention to provide a working machine provided with an upper/lower part joining device capable of increasing operationality with easy joint or release operation using a fixation means for joining divided clamps separately from a fluid pressure cylinder, as well as the related art, maintaining the advantages of simplifying the device and preventing a joint release due to a fluid leak or the like in the cylinder.

The working machine according to the present invention includes the following basic structure. That is, the working machine includes a lower traveling body, an upper rotating body rotatably mounted on the lower traveling body, and an upper/lower part joining device for detachably joining the lower traveling body and the upper rotating body by placing an upper ring provided on the upper rotating body on a lower ring provided on the lower traveling body and sandwiching flange parts formed in each of the both rings by a ring-shaped clamp device. Further, in the upper/lower part joining device, the flange parts are formed to protrude to an inner circumference side of the lower ring and the upper ring, and the clamp device is placed at the inner circumference side of the lower ring and the upper ring, being separated at four points, front side, back side, left side, and right side and divided into four divided clamps. At the separation points of the front side and the back side, the left and right divided clamps are relatively rotatably connected with each other through first connection members respectively, and at the separation points of the left side and the right side, the each of the front and back divided clamps is connected to single extension/contraction means through second connection members respectively. By extension/contraction operation of the extension/contraction means, the front and back divided clamps move between joint positions for sandwiching the flange parts of the lower ring and the upper ring and separation positions apart from the flange parts, and if the front and back divided clamps position at the joint positions, spaces of a predetermined length are formed between the front and back divided clamps. Further, position regulation means for regulating return of the divided clamps to the separation positions are arranged which are, corresponding to the separation points of both of the left side and right side of the clamp device, when the front and back divided clamps position at the joint positions respectively, inserted into the spaces between the front and back divided clamps. The position regulation means are provided to be movable between the insertion positions between the front and back divided clamps and wait positions inner than the insertion positions.

In this case, in order to sandwich the flange parts by the clamp device to join the lower traveling body and the upper rotating body, first, extension/contraction means provided at the separation points of both sides of left and right out of the four separation points of the clamp device are operated to contract respectively, and each divided clamp of the clamp device is moved to a joint position (a position outside in a radius direction than a separation position apart from the flange parts) for sandwiching the flange parts of the lower ring and the upper ring respectively. Then, between the front and back divided clamps, the spaces having the predetermined length are formed. Then, the position regulation means arranged corresponding to the separation points of both of left and right sides of the clamp device are inserted into the above spaces to regulate return of the divided clamps to the separation positions, and thus, the joint operation is completed. In the joined state, if a fluid leak or the like occurs in the cylinder, the each divided clamp of the clamp device is regulated not to return from the joint position to the separation position by the position regulation means. Accordingly, it is prevented that the clamp device opens and the joint is released.

On the other hand, in order to release the joint by the clamp device, first, at the separation points of both of left and right sides of the clamp device, the position regulation means are moved from the insertion positions between the front and back divided clamps to wait positions of inside respectively. Then, the extension/contraction means provided at the divided points of both of left and right sides are operated to extend respectively to move the each divided clamp of the clamp device to the separation position of inside apart from the flange parts of the lower ring and the upper ring, and thus, the release operation is completed.

As described above, according to the present invention, the four divided clamps of the ring-shaped clamp device are moved between the joint positions and the separation positions by the two extension/contraction means. Accordingly, the number of the extension/contraction means can be reduced and the device can be simplified.

Further, if the extension/contraction means is a fluid pressure cylinder, at the separation points of the both of left and right sides at the time the divided clamps are moved to the joint positions, the spaces of the predetermined length are formed between the front and back divided clamps respectively, and by inserting the position regulation means into the spaces, the divided clamps are prevented from returning from the joint positions to the separation positions. Accordingly, if a fluid leak or the like occurs in the cylinder, it is prevented that the clamps open and the joint is released, and security can be endured.

Further, in the working machine having the above-described structure, as operation means for moving the position regulation means between the insertion position and the wait position, a preferred operation device which is manually operated is provided. That is, it is preferable that the operation device includes a bar-shaped rod part which is to be inserted into an insertion hole provided in the lower ring and one end is joined to the position regulation means and a grip part which is provided at the other end of the rod part.

In this case, by a manual operation using the operation device, the position regulation means can be moved between the insertion position between the front and back divided clamps and the wait position of inside. Accordingly, the operation can be readily carried out and operationality can be increased. Further, the operation device simply includes the bar-shaped rod part and the grip part and the use is easy. Accordingly, an advantage that the operationality can be further improved can be expected in this view.

DESCRIPTION OF THE PREFERRED EMBODIMENTS

Hereinafter, a preferred embodiment of the present invention will be described with reference to the drawings.

Figure 1:
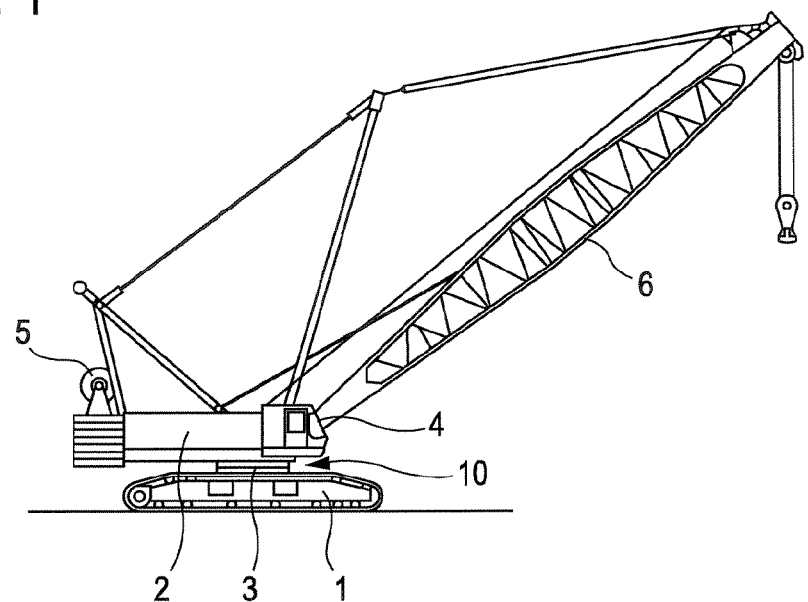
FIG. 1 is a side view of a crawler crane according to an embodiment of the present invention.

FIG. 1 shows a crawler crane as a working machine equipped with an upper/lower part joining device according to an embodiment of the present invention. Hereinafter, the crawler crane is described as an example.

Reference numeral 1 denotes a crawler type lower traveling body and reference numeral 2 denotes an upper rotating body rotatably mounted on the lower traveling body 1 through a rotation device 3. In the upper rotating body 2, a driver's cab 4 and various winches 5 or the like are provided and a boom 6 is mounted for derricking.

In the rotation device 3, an upper/lower part joining device 10 which detachably joins the lower traveling body 1 and the upper rotating body 2 is embedded. A structure of the upper/lower part joining device 10 is described in detail in FIGS. 2 and 3. That is, the upper/lower part joining device 10 includes a ring-shaped lower ring 11 which is fixed on an upper surface of the lower traveling body 1, and a rotation inside ring 16 which is mounted on the upper rotating body 2 through a mounting bolt 12, a rotation outside ring 13, and bearings 14 and 15 as a ring-shaped upper ring. In a state that the rotation inside ring 16 is placed on the lower ring 11, by sandwiching flange parts 17 and 18 formed in both rings 11 and 16 respectively with a ring-shaped clamp device 19, the both rings 11 and 16, that is, the lower traveling body 1 and the upper rotating body 2 are detachably joined.

In the lower ring 11, two members, that is, an upper member 21 and a lower member 22 are joined with bolts (not shown), and in the upper side member 21, the flange part 17 is formed so as to protrude to an inner circumference side. Further, in the rotation inside ring 16, similarly to the lower ring 11, two members, that is, an upper member 23 and a lower member 24 are joined with bolts 25, and in the lower side member 24, the flange part 18 is formed so as to protrude to the inner circumference side. On an outer circumference surface of the upper side member 23 of the rotation inside ring 16, through the bearings 14 and 15, the rotation outside ring 13 is mounted. On the inner circumference surface of the upper side member 23 of the rotation inside ring 16, an internal rotation gear 26 of the rotation device 3 is formed on the inner circumference surface of the upper side member 23 of the rotation inside ring 16. The rotation gear 26 engages with a pinion gear (not shown) installed on a rotation axis of a rotation motor of the rotation device 3 mounted on the upper rotating body 2, in response to a rotation of the rotation motor, revolves along the rotation gear 26 while engaging with the rotation gear 26, and the upper rotating body 2 rotates.

The clamp device 19 is placed at the inner circumference side of the lower ring 11 and the rotation inside ring 16, and fits and sandwiches the flange parts 17 and 18 of the lower ring 11 and the rotation inside ring 16 with a concaved part 30 formed on the outer circumference surface. The clamp device 19 is separated at ninety-degree intervals in the circumference direction, that is, four points of a front side, back side, left side, and right side, and divided into four divided clamps 31a, 31b, 31c, and 31d. At the separation points of the front side and the back side of the clamp device 19, the divided clamps 31a and 31b or 31c and 31d are relatively rotatably connected with each other respectively through connection pins 32, or the like, as first connection members. At the separation points of left side and the right side of the clamp device 19, the divided clamps 31a and 31d or 31b and 31c are connected to cylinders 34, as an extension/contraction means respectively through levers 33 as second connection members.

In this description, the four divided clamps which are separated at four points, that is, the front side, back side, left side, and right side, have been described as an example. However, the separation positions and the number of the divided clamps are not limited to the above.

The each lever 33 described above has, as shown in FIG. 4, an elbowed shape, that is, a substantially L-shape. A central part of the each lever 33 is rockably supported to the lower traveling body 1 through a spindle 35. One end of the each lever 33 is connected to the divided clamps 31a to 31d through connection pins 36 or the like, and the other end of the each lever 33 is connected to cylinder bodies 34a or piston rods 34b of the cylinders 34 through connection pins 37 or the like. By an extension/contraction operation of the cylinder 34, the front and back divided clamps 31a and 31d, or 31b and 31c move between a joint position (a position indicated by the solid line in FIG. 3) where the divided clamps sandwich the flange parts 17 and 18 of the lower ring 11 and the rotation inside ring 16, and a separation position (a position indicated by the virtual line in FIG. 3) where is apart from the flange parts 17 and 18, and a predetermined space 38 is formed between the front and back divided clamps 31a and 31d, or 31b and 31c when the front and back divided clamps 31a and 31d, or 31b and 31c position at the joint position.

Figure 4:
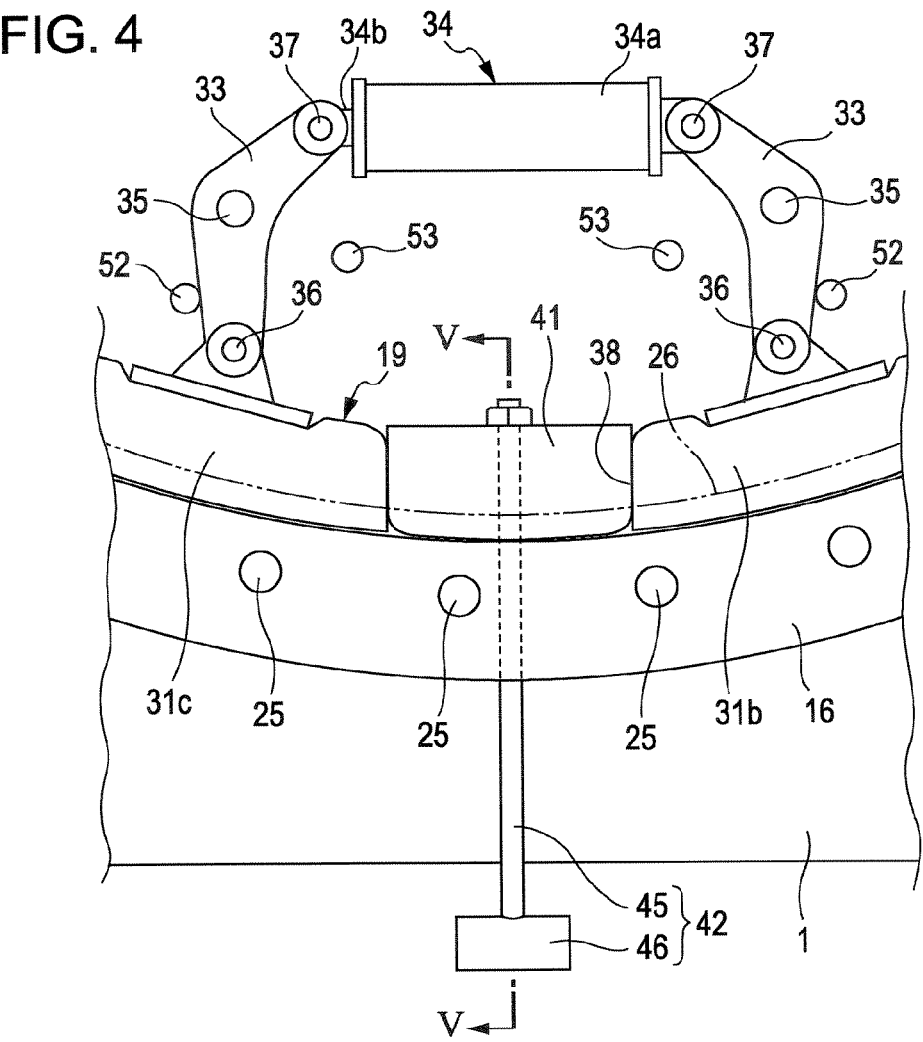
FIG. 4 is an enlarged view illustrating a vicinity of IV in FIG. 2.
Figure 5:
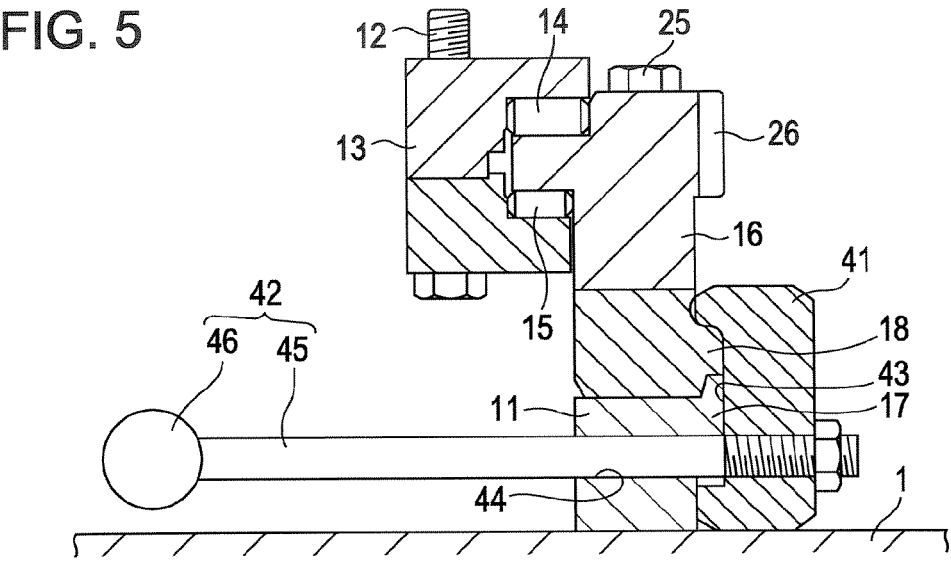
FIG. 5 is an cross sectional view taken along the line V-V in FIG. 4.

The upper/lower part joining device 10 further includes, a lock block 41 as a position regulation means for regulating the return of the divided clamps 31a and 31d, or 31b and 31c to the separation position which is inserted into the space 38 between the front and back divided clamps 31a and 31d, or 31b and 31c, when corresponding to the separation points of both of left and right sides of the clamp device 19, each of the front and back divided clamps 31a and 31d, or 31b and 31c position at the connection position, and includes an operation device 42 for moving the lock block 41 between the insertion position between the front and back divided clamps 31a and 31d, or 31b and 31c and a wait position which is inner than the insertion position. The lock block 41 has, as shown in detail in FIGS. 4 and 5, a concaved part 43 on an outside surface so as to come in contact with the flange parts 17 and 18 of the lower ring 11 and the rotation inside ring 16 at the concaved part 43 when positions at the insertion position. The operation device 42 includes a bar-shaped rod part 45 which is inserted into an insertion hole 44 provided in the lower ring 11 and one end (inner end) is connected to the lock block 41 and a grip part 46 which is provided at the other end (outer end) of the rod 45.

Figure 2:
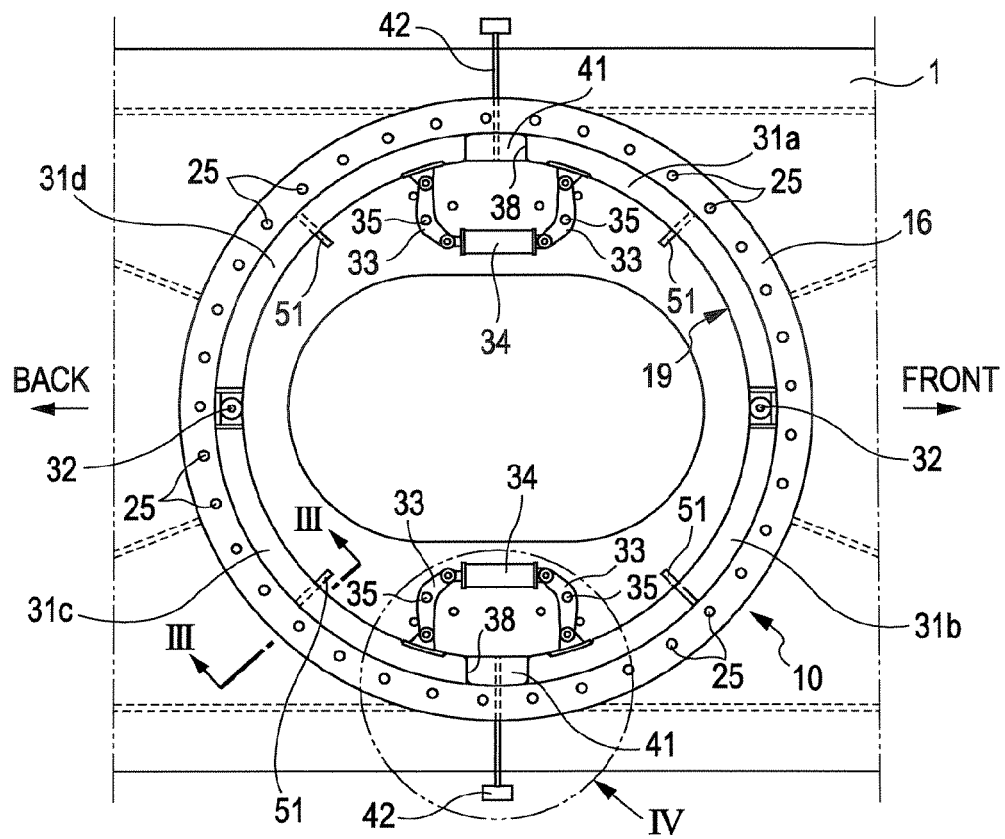
FIG. 2 is a plan view illustrating a vicinity of an upper/lower part joining device of a crawler crane according to the embodiment in which an upper rotating body is detached.
Figure 3:
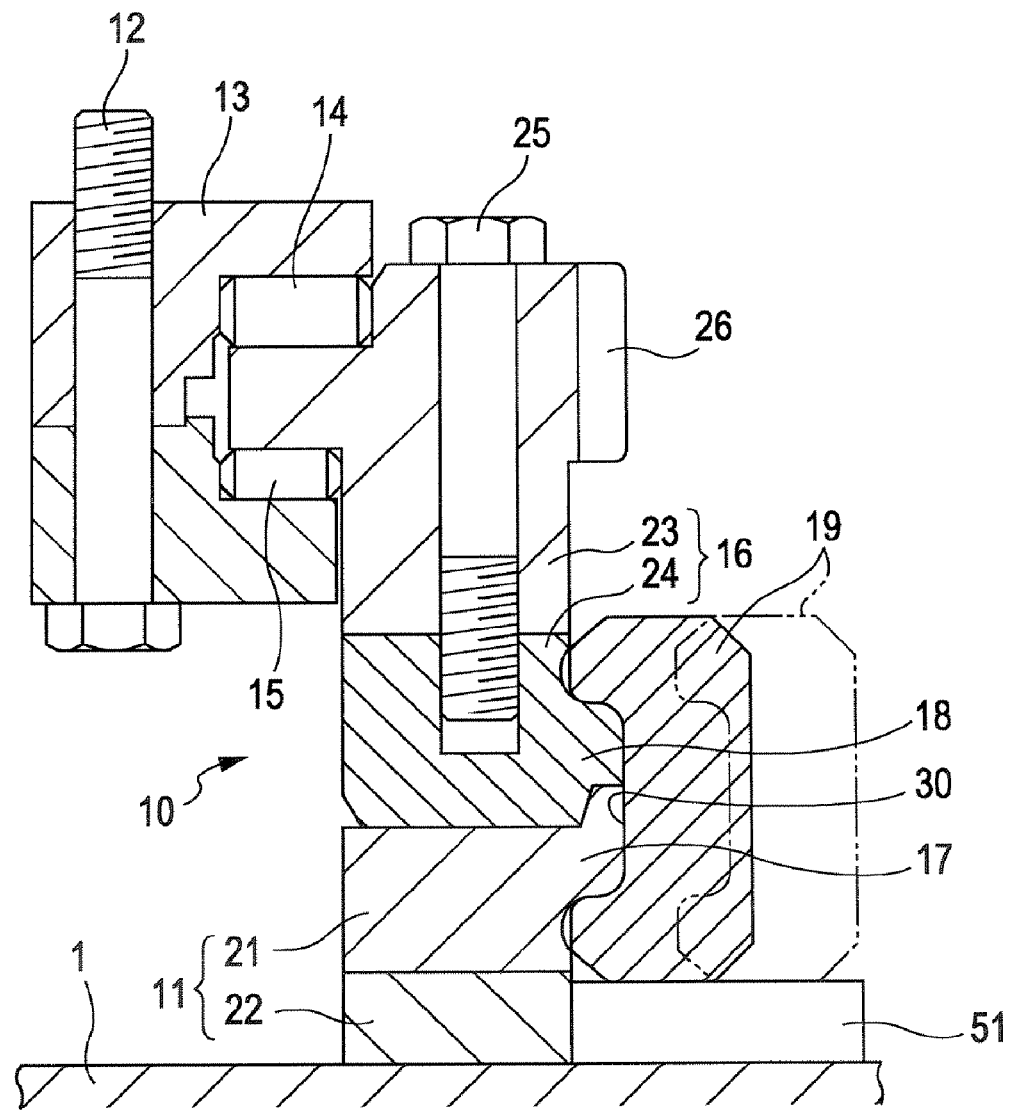
FIG. 3 is an enlarged cross sectional view taken along the line III-III in FIG. 2.

In FIGS. 2 and 3, reference numeral 51 denotes a plate-shaped supporting base fixed to the upper surface of the lower traveling body 1 corresponding to the central parts of the each divided clamps 31a to 31d. The each divided clamps 31a to 31d is supported on the supporting base 51, and when moving between the joint position and the separation position, slides on the supporting base 51. Further, in FIG. 4, reference numerals 52 and 53 denote a pair of stopper pins which is arranged in a standing condition on the upper surface of the lower traveling body 1 to regulate the rocking range of the each lever 33.

Now, operation procedure of joining the lower traveling body 1 and the upper rotating body 2 and releasing the joint by the upper/lower part joining device 10 will be described with reference to FIGS. 2, 6, and 7.

During the operation, a state that the rotation inside ring 16 of the upper rotating body 2 side is placed on the lower ring 11 of the lower traveling body 1 side shown in FIG. 3 is maintained.

Figure 6:
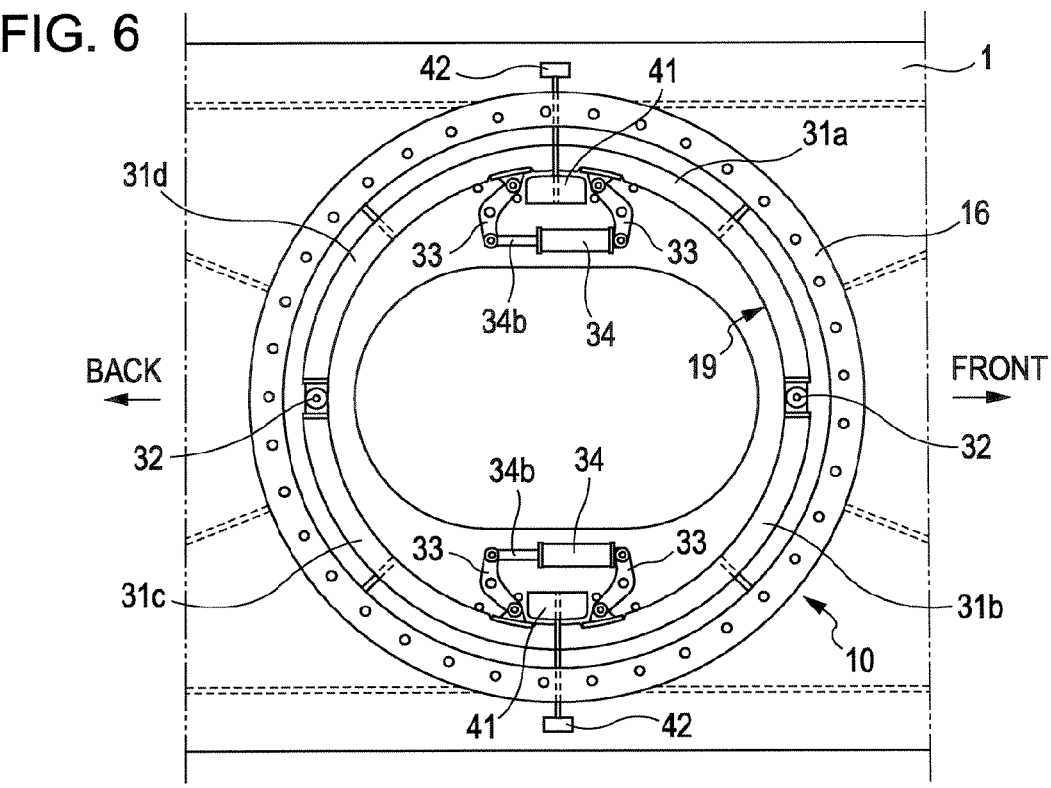
FIG. 6 is a view corresponding to FIG. 2 illustrating a state that a joint by the upper/lower part joining device is released.
Figure 7:
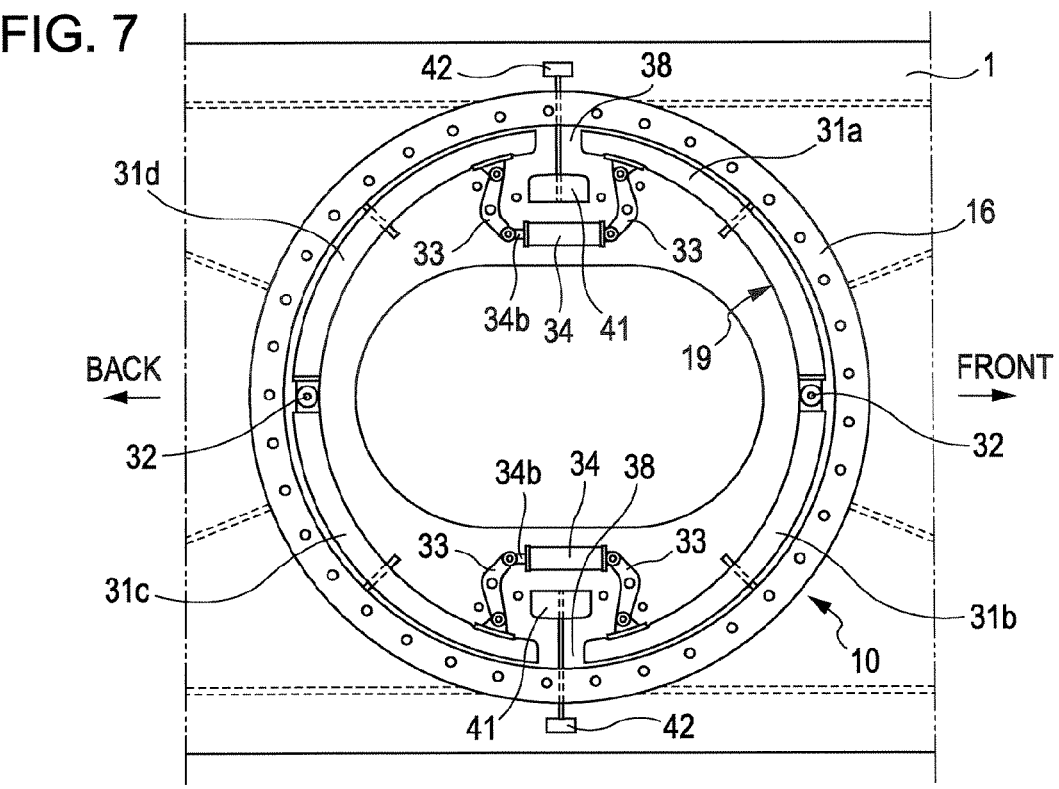
FIG. 7 is a view corresponding to FIG. 2 illustrating a state changing from the released state to a joint state.

As shown in FIG. 6, the each cylinder 34 of the upper/lower part joining device 10 is extended and the four divided clamps 31a to 31d of the clamp device 19 are placed at the separation positions which are inside (nearer the center) and away from the flange parts 17 and 18 of the lower ring 11 and the rotation inside ring 16 respectively. Further, the each lock block 41 is placed at the wait position which is inner than the insertion position between the front and back divided clamps 31a and 31d, or 31b and 31c.

At the state, to join the lower traveling body 1 and the upper rotating body 2, first, the each cylinder 34 is operated to contract respectively. Then, the each divided clamps 31a to 31d of the clamp device 19 moves to an outside in a radius direction from the separation position respectively as shown in FIG. 7, and finally, moves to the joint position to sandwich the flange parts 17 and 18 of the lower ring 11 and the rotation inside ring 13 as shown in FIG. 2. Then, between the front and back divided clamps 31a and 31d, or 31b and 31c, the space 38 of the predetermined length is formed respectively.

Then, at the each separation point of the left and right sides of the clamp device 19, by pulling outward the grip part 46 of the operation device 42 respectively, the lock blocks 41 are inserted into the each space 38 from the wait position to regulate the return of the divided clamps 31a to 31d to the separation points. With the operation above, the joint operation is completed.

In this state, if a fluid leak occurs in the cylinder 34, the each divided clamps 31a to 31d of the clamp device 19 is regulated not to return from the joint position to the separation position by the lock block 41. Accordingly, it is prevented that the clamp device 19 opens and the joint is released.

On the other hand, if the joint of the lower traveling body 1 and the upper rotating body 2, more particularly, the joint by the clamp device 19 is released, first, at each separation point of both of the left and right sides of the clamp device 19, by pushing the grip part 46 of the operation device 42 to the inside, the lock block 41 is moved from the insertion position between the front and back divided clamps 31a and 31d, or 31b and 31c to the wait position of the inside. Then, the each cylinder 34 of the upper/lower part joining device 10 is operated to extend respectively, and the each divided clamps 31a to 31d of the clamp device 19 is moved to the separation position of the inside which is apart from the flange parts 17 and 18 of the lower ring 11 and the rotation inside ring 16. With the operation above, the release operation is completed.

As described above, in the upper/lower part joining device 10, the four divided clamps 31a to 31d of the ring-shaped clamp device 19 move between the joint positions and the separation positions by the two cylinders 34. Accordingly, the number of the cylinders can be reduced and the device can be simplified. Further, at the separation positions of both of left and right sides at the time the divided clamps 31a to 31d moved to the joint positions, the predetermined spaces 38 are formed between the front and back divided clamps 31a and 31d, or 31b and 31c respectively. Into the spaces 38, the lock blocks 41 are inserted to regulate the divided clamps 31a to 31d not to return from the joint positions to the separation positions. Thus, if a fluid leak or the like occurs in the cylinder 34, it is prevented that the clamp device 19 opens and the joint is released, and security is ensured.

Further, the lock block 41 is simply operated by the operation device 42 to move between the insertion position between the front and back divided clamps 31a and 31d, or 31b and 31c and the wait position of the inside. Accordingly, the operation can be readily carried out and the operationality can be increased. Further, the operation device 42 simply has the bar-shaped rod part 45 and the grip part 46, and the use of the parts is easy. Accordingly, the operationality can be further increased in this view.

It is to be understood that the present invention is not limited to the above embodiment, but covers various modifications. That is, in the above-described embodiment, the rotation inside ring 16 of the rotation device 3 is placed on the lower ring 11 of the lower traveling body 1 and the flange parts 17 and 18 formed in the both rings 11 and 16 respectively are sandwiched by the clamp device 19. However, a structure described below is also covered. For example, the present invention can also be applied to a structure that the rotation outside ring 13 of the rotation device 3 is placed on the lower ring 11 of the lower traveling body 1 and flange parts formed in the both rings 11 and 13 respectively are sandwiched by a ring-shaped clamp device.

Further, in the above-described embodiment, the operation device 42 for moving the lock block 41 between the insertion position between the front and back divided clamps 31a and 31d, or 31b and 31c and the wait position of the inside by manual operation is provided. However, in the present invention, instead of the operation device 42, by hydraulic operation using a hydraulic cylinder or the like, the lock block 41 can be moved between the insertion position and the wait position.

Further, in the above-described embodiment, the present invention is applied to the upper/lower part joining device of the crawler crane. However, the present invention is not limited to the crawler crane but can be widely applied to upper/lower part joining devices of working machines in which a lower traveling body and an upper rotating body has to be detachably joined.

Although the invention has been described with reference to the preferred embodiments in the attached figures, it is noted that equivalents may be employed and substitutions made herein without departing from the scope of the invention as recited in the claims.

What is claimed is:

1. A working machine comprising:
    a lower traveling body;
    an upper rotating body rotatably mounted on the lower traveling body; and
    an upper/lower part joining device detachably joining the lower traveling body and the upper rotating body, the upper/lower part joining device including an upper ring provided on the upper rotating body on a lower ring provided on the lower traveling body and sandwiching flange parts formed in each of the both rings by a ring-shaped clamp device,
    wherein in the upper/lower part joining device, the flange parts are formed to protrude to an inner circumference side of the lower ring and the upper ring, and the clamp device is, while being placed at the inner circumference side of the lower ring and the upper ring, and being separated at four points, a front side, a back side, a left side, and a right side and divided into four divided clamps, at separation points of the front side and the back side, the left and right divided clamps are relatively rotatably connected with each other through first connection members respectively, and at the separation points of the left side and the right side, the each of the front and back divided clamps is connected to single extension/contraction means through second connection members respectively, by an extension/contraction operation of the extension/contraction means, the front and back divided clamps move between joint positions for sandwiching the flange parts of the lower ring and the upper ring and separation positions apart from the flange parts, and if the front and back divided clamps position at the joint positions, spaces of a predetermined length are formed between the front and back divided clamps, and
    wherein position regulation means for regulating return of the divided clamps to the separation positions are arranged which are, corresponding to the separation points of both of left side and right side of the clamp device, when the front and back divided clamps position at the joint positions respectively, inserted into the spaces between the front and back divided clamps, and the position regulation means are provided to be movable between insertion positions between the front and back divided clamps and wait positions inside the insertion positions.

2. The working machine according to claim 1, further comprising:
    an operation device for moving the position regulation means between the insertion position and the wait position,
    wherein the operation device comprises a rod part inserted into an insertion hole provided in the lower ring and one end is joined to the position regulation means, and a grip part provided at the other end of the rod part.

3. The working machine according to claim 1, wherein the first connection member comprises a connection pin, the second connection member comprises a lever, the extension/contraction means comprises a fluid pressure cylinder, and the position regulation means comprises a lock block.

* * * * *